US008587838B2

(12) United States Patent
Oosawa

(10) Patent No.: US 8,587,838 B2
(45) Date of Patent: Nov. 19, 2013

(54) IMAGE PROCESSING APPARATUS, CONTROL METHOD THEREFOR, CONTROL PROGRAM AND STORAGE MEDIUM

(75) Inventor: Takaharu Oosawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 401 days.

(21) Appl. No.: 12/104,880

(22) Filed: Apr. 17, 2008

(65) Prior Publication Data

US 2009/0323127 A1    Dec. 31, 2009

(30) Foreign Application Priority Data

Apr. 19, 2007  (JP) ................................ 2007-110604

(51) Int. Cl.
*H04N 1/00*  (2006.01)
(52) U.S. Cl.
USPC .............. 358/401; 358/1.1; 358/2.1; 358/1.8; 358/3.28; 726/20
(58) Field of Classification Search
USPC ............... 358/1.1, 2.1, 1.8, 3.28, 401; 726/20
See application file for complete search history.

(56) References Cited

U.S. PATENT DOCUMENTS

| 7,039,214 | B2 * | 5/2006 | Miller et al. ................... 382/100 |
| 7,609,396 | B2 * | 10/2009 | Harada .......................... 358/1.1 |
| 7,770,220 | B2 * | 8/2010 | Fernstrom ....................... 726/20 |
| 2005/0219599 | A1 * | 10/2005 | White et al. ................. 358/1.14 |
| 2007/0030521 | A1 * | 2/2007 | Fujii et al. .................... 358/3.28 |

FOREIGN PATENT DOCUMENTS

| JP | 2001-315400 A | 11/2001 |
| JP | 2004-228897 A | 8/2004 |
| JP | 2007-88827 A | 4/2007 |

\* cited by examiner

*Primary Examiner* — Twyler Haskins
*Assistant Examiner* — Michael Burleson
(74) *Attorney, Agent, or Firm* — Rossi, Kimms & McDowell LLP

(57) ABSTRACT

An image processing apparatus which, in outputting images including copies of original images, if an image that has restriction information embedded therein and an image that has no restriction information embedded therein are in a state mixed in the original images, is capable of embedding the restriction information in an image that is output based on the image that has no restriction information embedded therein. When the copy restriction information is extracted from a read image, the copy restriction information is stored in an embedded information-extracting section. When the copy restriction information is not extracted from the read image, dot pattern data corresponding to the copy restriction information stored in the embedded information-extracting section is generated. The dot pattern data and image data output from a scanner are synthesized. A printer prints an image on a sheet based on the synthesized image data.

9 Claims, 15 Drawing Sheets

010,111,110,011=2,7,6,3

IMAGE PROCESSING APPARATUS, CONTROL METHOD THEREFOR, CONTROL PROGRAM AND STORAGE MEDIUM

BACKGROUND OF THE INVENTION

1. Field of the Invention

The present invention relates to an image processing apparatus which outputs an image, a control method therefor, a control program, and a storage medium.

2. Description of the Related Art

Conventionally, there has been proposed a technique which restricts copying of a printed matter, so as to ensure the security of the printed matter (see e.g. Japanese Laid-Open Patent Publication (Kokai) No. 2004-228897). More specifically, as copy restriction information for inhibiting copying of a printed matter, a password or the like is embedded in the printed matter in the form of a dot pattern or a bar cord, by way of example. The inhibition of copying the printed matter is canceled by authentication using the password.

For example, when a plurality of printed matters have the same copy restriction information embedded therein, the above-described technique is capable of uniformly restricting copying of the printed matters.

However, for example, when a printed matter A that has copy restriction information embedded therein and a printed matter B that has no copy in a mixed state for copying, a copy that has the copy restriction information of the printed matter A embedded therein is obtained as a copy of the printed matter A. In contrast, a copy that has no copy restriction information embedded therein is obtained as a copy of the printed matter B.

Thus, when documents including the copy of the printed matter A and the copy of the printed matter B in a state mixed therein are to be distributed e.g. as a document group placed under the same control, it is impossible to uniformly restrict coping of all the distributed documents.

SUMMARY OF THE INVENTION

The present invention provides an image processing apparatus, a control method therefor, and a control program, which, in outputting images including copies of original images, if an image that has restriction information embedded therein and an image that has no restriction information embedded therein are in a state mixed in the original images, is capable of embedding the restriction information in an image that is output based on the image that has no restriction information embedded therein, and a storage medium storing the control program.

In a first aspect of the present invention, there is provided an image processing apparatus which outputs an image, comprising a reader unit configured to read an image, an extraction unit configured to extract restriction information that restricts output of an image based on the image read by the reader unit, from the image read by the reader unit, a storage unit configured to store the restriction information that is extracted by the extraction unit from a first image read by the reader unit, and an output unit configured to output an image based on an image representing the restriction information stored in the storage unit and a second image read by the reader unit, according to no extraction of the restriction information from the second image read by the reader unit, by the extraction unit.

According to the present invention, in outputting images including copies of original images, if an image that has restriction information embedded therein and an image that has no restriction information embedded therein are in a state mixed in the original images, it is possible to cause the restriction information to be embedded in an image that is output based on the image that has no restriction information embedded therein.

The image processing apparatus comprises an image generation unit configured to generate the image representing the restriction information stored in the storage unit, and an image synthesis unit configured to synthesize the image generated by the image generation unit and the second image read by the reader unit, and the output unit can output the image synthesized by the image synthesis unit.

The image generated by the image generation unit can be a low visibility image.

The image generated by the image generation unit can be a dot pattern representing the restriction information.

The image processing apparatus comprises a control unit configured to restrict output of an image based on the first image read by the reader unit, according to the restriction information extracted by the extraction unit.

The output unit can print an image based on the image indicating the restriction information stored in the storage unit and the second image read by the reader unit, or transfer the image based on the image indicating the restriction information stored in the storage unit and the second image read by the reader unit.

In a second aspect of the present invention, there is provided a method of controlling an image processing apparatus that outputs an image, comprising a reading step of reading an image, an extraction step of extracting restriction information that restricts output of an image based on the image read in the reading step, from the image read in the reading step, a storage step of storing the restriction information that is extracted in the extraction step from a first image read in the reading step, in a storage unit, and an output step of outputting an image based on an image representing the restriction information stored in the storage unit and a second image read in the reading step, according to no extraction of the restriction information from the second image read in the reading step, in the extraction step.

In a third aspect of the present invention, there is provided a program for causing a computer to execute a method of controlling an image processing apparatus which reads an image to output an image based on the read image, wherein the method comprises a reading step of reading an image, an extraction step of extracting restriction information that restricts output of an image based on the image read in the reading step, from the image read in the reading step, a storage step of storing the restriction information that is extracted in the extraction step from a first image read in the reading step, in a storage unit, and an output step of outputting an image based on an image representing the restriction information stored in the storage unit and a second image read in the reading step, according to no extraction of the restriction information from the second image read in the reading step, in the extraction step.

In a fourth aspect of the present invention, there is provided a computer-readable storage medium which stores a program for causing a computer to execute a method of controlling an image processing apparatus which reads an image to output an image based on the read image, wherein the method comprises a reading step of reading an image, an extraction step of extracting restriction information that restricts output of an image based on the image read in the reading step, from the image read in the reading step, a storage step of storing the restriction information that is extracted in the extraction step from a first image read in the reading step, in a storage unit, and an output step of outputting an image based on an image representing the restriction information stored in the storage unit and a second image read in the reading step, according to no extraction of the restriction information from the second image read in the reading step, in the extraction step.

The features and advantages of the invention will become more apparent from the following accompanying drawings.

DETAILED DESCRIPTION OF THE EMBODIMENTS

The present invention will now be described in detail with reference to the drawings showing preferred embodiments thereof.

Figure 1:
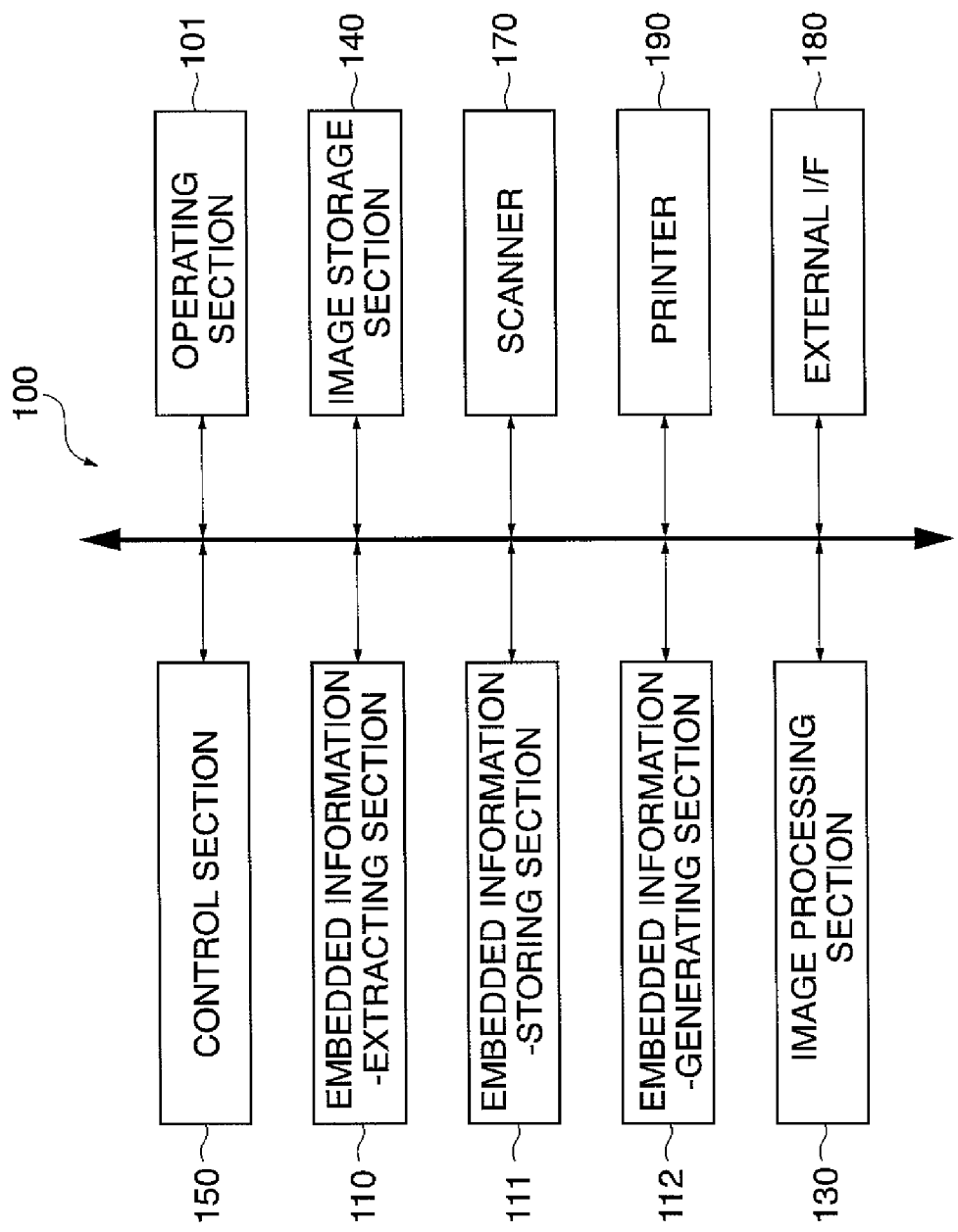
FIG. 1 is a functional block diagram of an image processing apparatus according to a first embodiment of the present invention.

FIG. 1 is a functional block diagram of an image processing apparatus according to a first embodiment of the present invention. In the present embodiment, the image processing apparatus will be described by taking a copying machine as an example.

Referring to FIG. 1, the copying machine 100 includes an operating section 101, and a control section 150. The operating section 101 includes a key group for inputting user instructions, such as settings of operations, and a display for displaying operating states of the copying machine 100, details of set modes, and so forth. The control section 150 is comprised e.g. of a CPU, a ROM, and a RAM (none of which are shown). The above-mentioned CPU executes programs stored in the ROM in response to instructions input by the user via the operating section 101 and controls the operations of the copying machine 100. The control by the CPU, i.e. the control section 150 includes the control of operations of a scanner 170, an embedded information-extracting section 110, an embedded information-storing section 111, an embedded information-generating section 112, an image processing section 130, an image storage section 140, a printer 190, and an external I/F (interface) 180.

The scanner 170 reads an image on an original and outputs image data of the image read from the original. The embedded information-extracting section 110 extracts information embedded in the read image data (embedded information) based on the image data output from the scanner 170. The embedded information includes copy restriction information and tracking information, as described hereinafter. The embedded information-storing section 111 stores the embedded information extracted by the embedded information-extracting section 110. It is assumed that the embedded information-storing section 111 is formed by storage units, such as the RAM, a nonvolatile memory, a hard disk, and so forth. The embedded information-generating section 112 (an image generation unit) generates image data of a dot pattern, which the copy restriction information of the embedded information stored in the embedded information-storing section 111 is embedded in the form of LVBC, based on the copy restriction information. The LVBC will be described hereinafter.

The image processing section 130 performs predetermined image processing on the image data output from the scanner 170. Further, the image processing section 130 (an image superimposing unit) superimposes the image data generated in the embedded information-generating section 112 and the image data output from the scanner 170 on each other. Thus, image data having the copy restriction information embedded therein is generated. The image storage section 140 stores the image data processed by the image processing section 130 and attributes thereof. The printer 190 has the image data stored in the image storage section 140 input thereto and prints the image data to output a print of the image data. The external I/F 180 is an interface for transmitting the image data to an external apparatus or device connected to the copying machine 100.

The embedded information-generating section 112, the image processing section 130 and the printer 190 cooperate with each other to form an output unit that outputs, when no copy restriction information is extracted from the read original, a copy having embedded therein the same copy restriction information as the copy restriction information stored in the embedded information-storing section 111, as a copy of the original. Further, the embedded information-extracting section 110, the embedded information-generating section 112, and the image processing section 130 may be constructed by hardware or software. When they are constructed by software, a program for constructing the embedded information-extracting section 110, the embedded information-generating section 112, and the image processing section 130 is stored in the ROM of the control section 150, and the program modules corresponding thereto are executed by the CPU.

Next, a description will be given of a method of embedding information in an original.

In the present embodiment, information is embedded into an original in the form of Low Visibility Barcode (hereinafter referred to as "the LVBC").

The phrase "to embed information into the original" is intended to mean to print not only an image that should be printed but also information desired by the system in a low visibility state, on an image recording medium, such as paper or an OHP sheet, (hereinafter referred to as a "sheet"), by a printing apparatus.

In general, requirements for embedded information include the following. In the present embodiment, information embedded in an original in the form of LVBC satisfies the following requirements.

(1) Data having a sufficient amount of information can be embedded in a sheet.

(2) Information embedded in a sheet using a color material (toner or ink) can be reliably extracted as digital information afterwards.

(3) When an image on an original is copied on a sheet, the image has a certain degree of resistance to factors that hinder extraction of information, such as rotation, enlargement, reduction, and partial deletion of the original, blunting of a signal due to copying, and stains.

(4) To inhibit copying of an original that has information for inhibiting copying thereof embedded therein, it is possible to extract the information in real time or at high speed when copying the original.

Figure 2B:
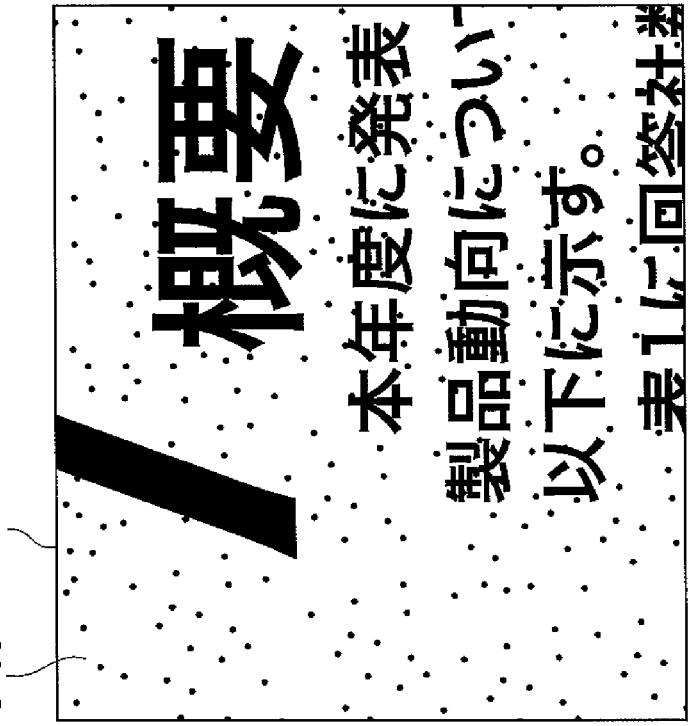
FIG. 2B is an enlarged partial view of FIG. 2A.
Figure 2A:
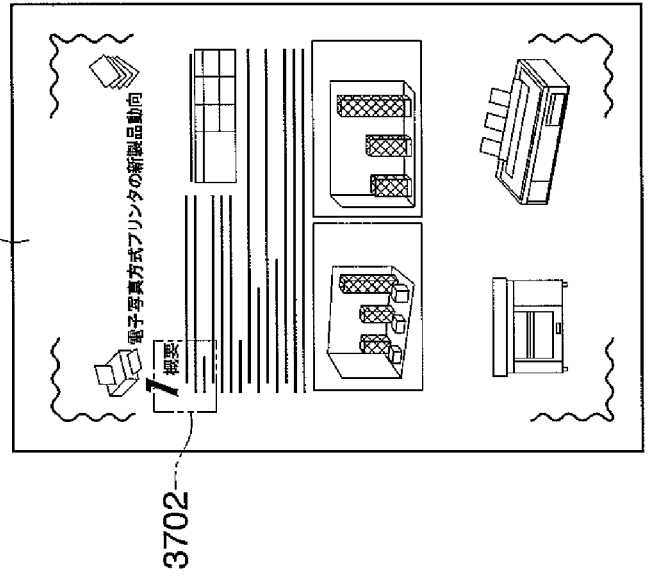
FIG. 2A is a view showing an example of an image of an original having additional information embedded therein in the form of LVBC.

FIG. 2A is a view showing an example of an image of an original having additional information embedded therein in the form of LVBC, and FIG. 2B is an enlarged partial view of FIG. 2A.

The original 3701 shown in FIG. 2A has information embedded therein in the form of LVBC. FIG. 2B is an enlarged view of an area 3702 of the original 3701. In the area 3702, not only an image which should be formed on the original 3701 but also a large number of dots 3703 seemingly randomly arranged are printed. The information is represented by the large number of dots 3703. Such a form of embedding information is referred to as "LVBC".

Next, a description will be given of areas in which information is to be embedded. There are provided two kinds of areas, first and second areas, as areas in which information is to be embedded. The two kinds of areas are used separately and differently according to the respective manners of use of the information.

In the first areas, information for inhibiting the copying of an original or canceling the inhibition, that is, the copy restriction information is embedded. The copy restriction information is required to be extracted at a high speed by normal scanning during a copying operation (i.e. the information should be detected in real time). An extraction process for extracting the copy restriction information is necessarily carried out on any original, and hence delay of the process adversely affects the overall speed of the copying operation. Therefore, the extraction process is required to be executed at a high speed which is, for example, substantially equal to a However, the copy restriction information, such as the information for inhibiting the copying of an original or canceling the inhibition, has a characteristic that the amount of information required for representing contents thereof is very small, and hence the required data size is small.

The tracking information is embedded in the second areas. For example, when leakage of information is found, the tracking information is extracted by an administrator for analyzing the reason for the leakage, and hence is unnecessary for a normal copying operation. Therefore, the tracking information has a characteristic that extraction thereof does not adversely affect the overall speed of the copying operation, and real time extraction thereof is not required. More specifically, a relatively low speed is permitted as a speed for extracting the tracking information. Further, there is a possibility that the tracking information can be large in amount, and hence it requires a relatively large data size. The tracking information includes the personal name of a user who prepared the original, the name of an organization to which the user belongs, and the machine number, IP (Internet Protocol) address, and MAC (Media Access Control) address of an apparatus which performed image formation, so forth. Furthermore, the tracking information may include a place where the apparatus is installed, printing date/time specifying when printing was performed, and like information.

In the present embodiment, it is possible to embed information associated with the first and second areas, in the form of LVBC, in the respective first and second areas which are mixed with each other, such that it is possible to extract only the copy restriction information embedded in the first areas, only the tracking information embedded in the second areas, or the information embedded in the first and second areas, respectively, according to the case of use. Further, when only the copy restriction information embedded in the first areas is to be extracted, it is extracted at a speed that does not adversely affect copying productivity.

Figure 3:
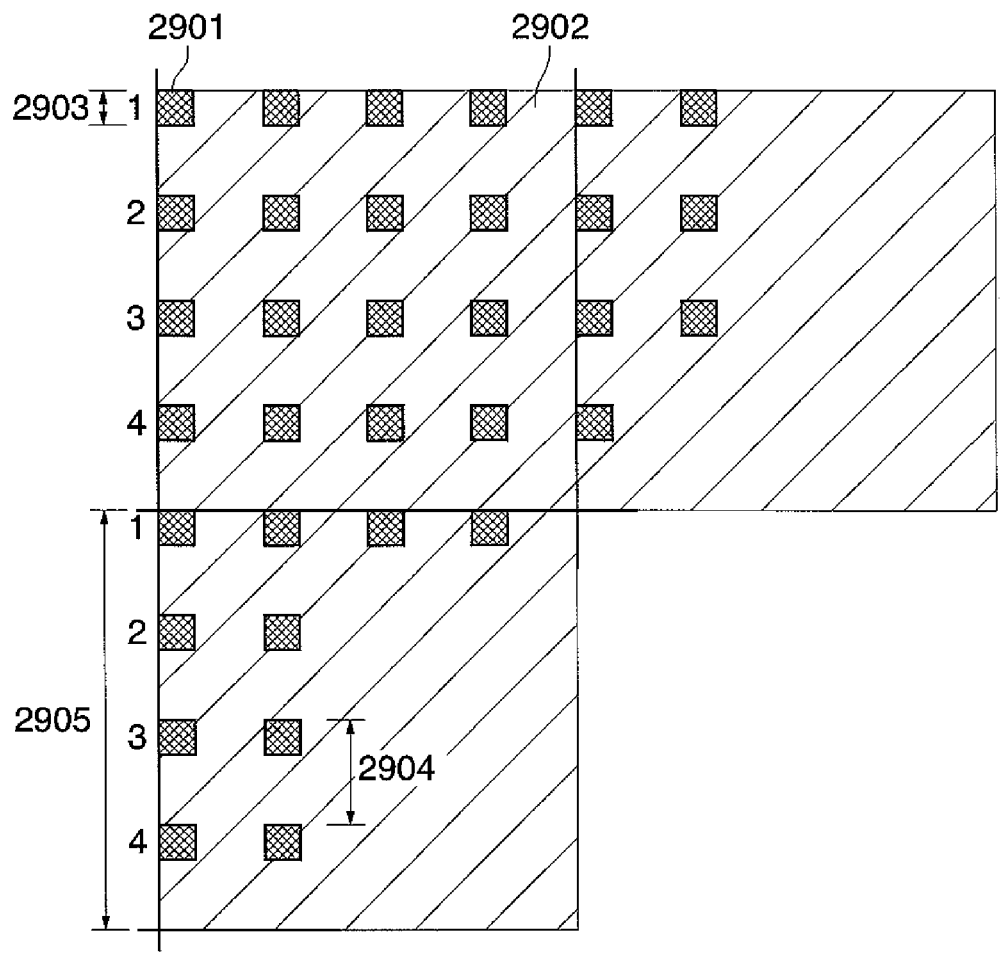
FIG. 3 is a schematic view of an example of the arrangement relationship between first areas and second areas in which additional information is embedded in a sheet in the form of LVBC.

Next, the arrangement relationship between the above-mentioned first and second areas on a sheet will be described with reference to FIG. 3. FIG. 3 is a schematic view useful in explaining an example of the arrangement relationship between the first and second areas in which information is embedded in the form of LVBC.

As shown in FIG. 3, a plurality of rectangular first areas 2901 are arranged in a regular pattern on the sheet. In the illustrated example, the first areas 2901, each formed by a square area one side of which has a length 2903, are arranged by repeatedly disposing the same area at intervals of a distance 2904. In other words, the copy restriction information of the same content is embedded in all the first areas 2901. By repeatedly arranging the first areas 2901, redundancy of the copy restriction information is increased to enhance reliability of the extracted copy restriction information against noises and errors.

Similarly to the first areas 2901, a plurality of rectangular second areas 2902 are arranged in a regular pattern on the sheet. In the illustrated example, the second areas 2902 are each formed by a square area one side of which has a length 2905. The information that should be embedded in the first areas 2901 is not embedded in the second areas 2902. Each area 2901 and each area 2902 have respective associated kinds of information embedded therein.

Figure 4:
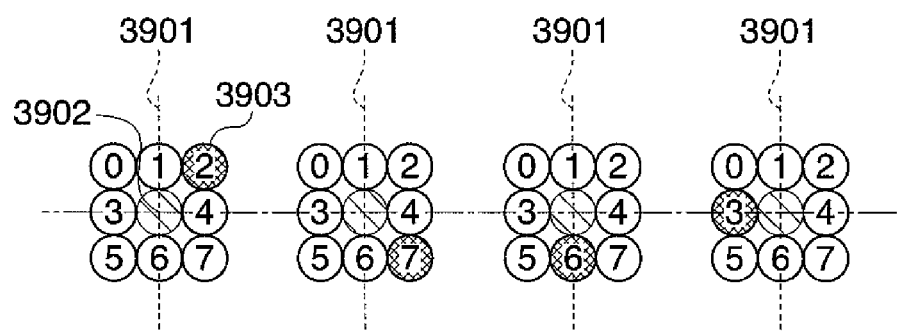
FIG. 4 is a view showing an example in which binary data "010111110011" is embedded in the form of LVBC.

Next, a method of embedding information in the form of LVBC will be described with reference to FIG. 4. FIG. 4 is a view showing an example in which binary data "010111110011" is embedded in the form of LVBC.

When information is embedded in the form of LVBC, not only an image (hereinafter referred to as "the original image") which should be printed on a sheet, but also a dot pattern called a grid is printed so as to embed information. Referring to FIG. 2B, a large number of dots 3703 constitute the grid. The grid is a combination of dots vertically and horizontally arranged at equal space intervals. When the dots disposed on the grid are connected with shortest distances by respective imaginary lines (guide lines), there appear an imaginary grid pattern formed by the imaginary lines vertically and horizontally drawn at predetermined space intervals.

Embedded information is input as binary data which is not larger than a predetermined size. This information is embedded by displacing each dot with respect to (from the center of) the associated one of the dots (grid points) constituting the grid, vertically, horizontally, or diagonally, i.e. in one of eight directions.

For example, as shown in FIG. 4, when the binary data of 010111110011 is embedded as information, it is assumed that vertical and horizontal lines 3901 are the imaginary guide lines determining the positions of respective grid points (grid-point positions). When the grid points are connected to each other by the vertical and horizontal lines 3901 with a shortest distance as mentioned above, the grid pattern appears. Now, when a position 3902 designates the central position of a grid point, no dot is disposed at the central position 3902, but a dot, such as a dot 3903, is disposed at a location away from the central position 3902.

The binary data of 010111110011 is decomposed into 3-bit groups, i.e. 010, 111, 110, and 011. Further, the 3-bit groups are subjected to decimal conversion to be converted into 2, 7, 6, and 3, respectively. Each dot as a component of the grid is displaced vertically, horizontally, or diagonally, i.e. in one of the eight directions, whereby a corresponding numerical value can be represented. In this case, the respective dots for information of the numerical values 2, 7, 6, and 3 are displaced right upward, right downward, downward, and leftward, respectively. Thus, information is embedded. It is possible to embed information in the form of LVBC by repeatedly carrying out the above-described processing. When the LVBC is used, it is possible to embed information of approximately 2000 bytes in a sheet. Further, by arranging a plurality of areas formed with dots representing information on the sheet in a regular pattern, it is possible to increase redundancy of embedded information to thereby improve the identifying property of dots representing information against the stains, creases, or partial breakage of the original image and the sheet. This makes it possible to improve reliability of the extracted information.

It should be noted that in the case of analyzing dot patterns formed in the respective areas, it is required to accurately detect the respective positions of grid points, and it is preferred that dot displacements in the eight directions occur with equal probability. However, lots of specific data representative of e.g. 0 are contained in embedded information. In such a case, the displacements of dots in the eight directions cannot occur with equal probability unless further processing is executed. To solve this problem, in the present embodiment, reversible scrambling (e.g. shared key encryption processing) is performed on the additional information to randomize dot displacement.

The first areas 2901 and the second areas 2902 in FIG. 3 are synthesized when embedding respective kinds of information therein. In this case, as described above, the associated kinds of information are embedded in the respective areas 2901 and 2902 by converting each unit of information into displacement of each dot.

Figure 5:
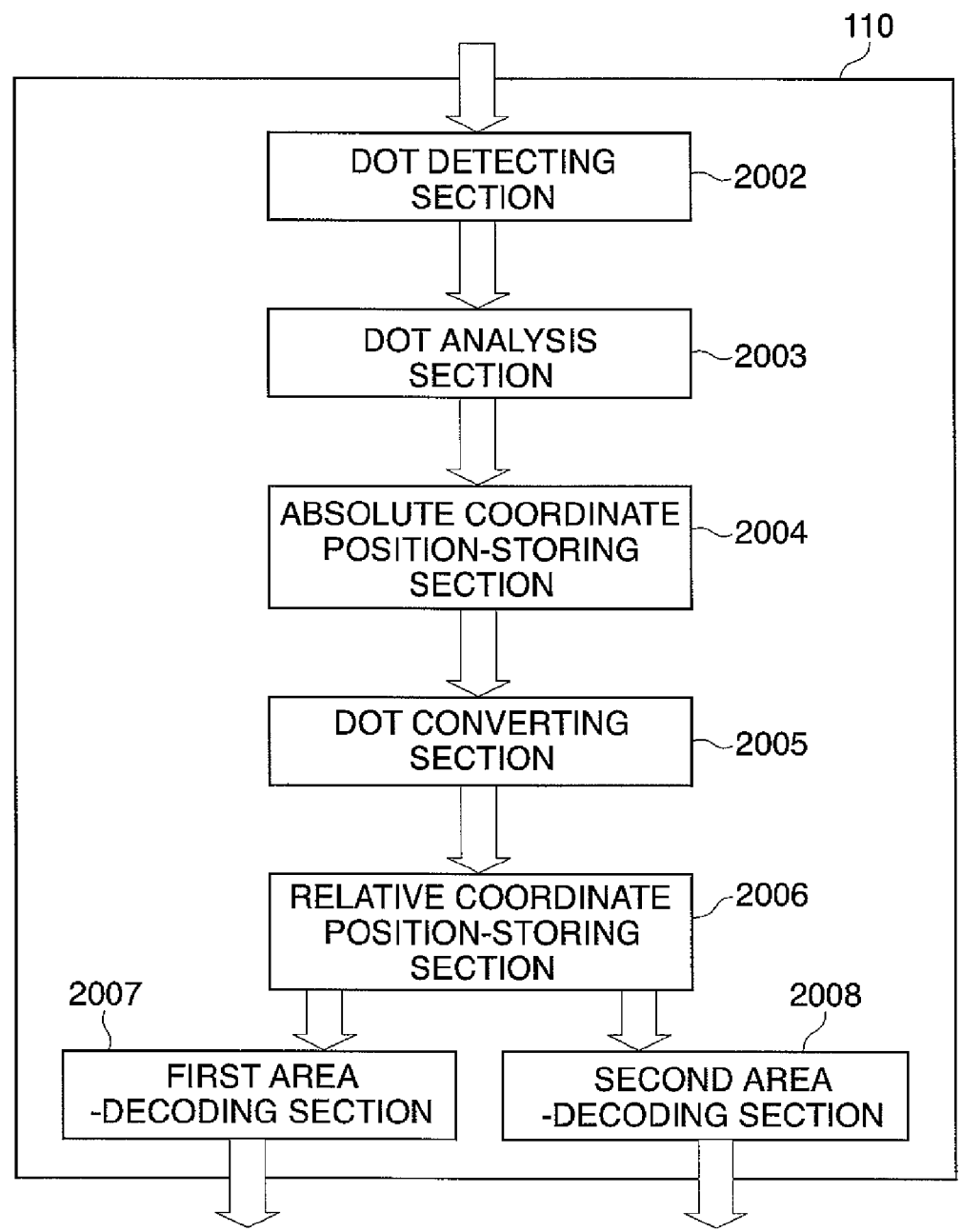
FIG. 5 is a block diagram showing an embedded information-extracting section appearing in FIG. 1.

Next, the configuration of the above-described embedded information-extracting section 110 (FIG. 1) will be described with reference to FIG. 5. FIG. 5 is a block diagram showing the configuration of the FIG. 1 embedded information-extracting section 110.

As shown in FIG. 5, the embedded information-extracting section 110 includes a dot detecting section 2002, a dot analysis section 2003, an absolute coordinate position-storing section 2004, a dot converting section 2005, a relative coordinate position-storing section 2006, a first area-decoding section 2007 and a second area-decoding section 2008.

The dot detecting section 2002 detects desired dots and positions thereof from an image having information embedded therein (image in which the original image and images of dot patterns indicative of the embedded information are mixed). The dot analysis section 2003 eliminates unnecessary dots, such as dots constituting halftone, from the numerous dots detected by the dot detecting section 2002. The absolute coordinate position-storing section 2004 stores the respective absolute coordinate positions of a plurality of dots obtained by eliminating the unnecessary dots by the dot analysis section 2003. The dot converting section 2005 detects a rotational angle of the grid and grid spacing (intervals of grid lines) with reference to the absolute coordinate position stored in the absolute coordinate position-storing section 2004, and converts the absolute coordinate position of each dot into relative coordinates with respect to an associated grid-point position. The relative coordinate position-storing section 2006 stores the position of each dot converted into relative coordinates with respect to the associated grid-point position by the dot converting section 2005.

The first area-decoding section 2007 extracts the first areas to extract the copy restriction information embedded in the first areas. The second area-decoding section 2008 extracts the second areas to extract the copy restriction information embedded in the second areas. The respective pieces of information extracted by the first area-decoding section 2007 and second area-decoding section 2008 are stored in the embedded information-storing section 111. Further, the extracted information is output to the control section 150. The control section 150 performs a copying process or restricts the copying process according to the copy restriction information. For example, when authentication information (e.g. a password) for canceling inhibition of copy is embedded in an original as the copy restriction information, authentication is performed using the embedded authentication information. When validity of the user is authenticated by the authentication, the inhibition of copying is canceled to perform copying of the original, whereas when the validity of the user is not authenticated by the authentication, copying of the original is restricted. Further, the control section 150 carries out a process e.g. for outputting the tracking information (e.g. information on the owner of the sheet).

Figure 6:
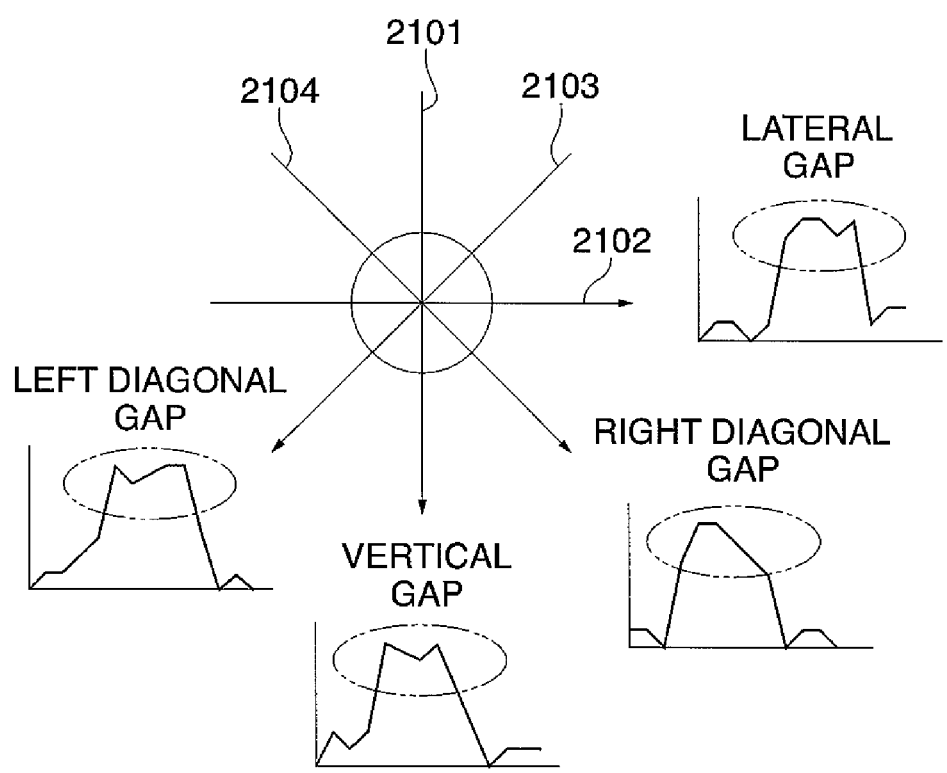
FIG. 6 is a conceptual view of a method of performing a dot-detecting process by a dot detecting section appearing in FIG. 5.

Next, the process carried out by the dot detecting section 2002 will be described with reference to FIG. 6. FIG. 6 is a conceptual view of a method of performing a dot-detecting process by the dot detecting section 2002 shown in FIG. 5.

The dot detecting section 2002 inputs image data read by the scanner 170 as multivalued monochrome image data. Embedded information is embedded in the form of monochrome binary dots, but each dot is input as a slightly blunted signal e.g. due to a degree of sticking of toner during embedding the information, handling of the sheet, and the operation of the optical system during scanning. Therefore, to eliminate influence of such factors on the detection, each dot included in the input image is detected, and the center-of-gravity position of the detected dot is recognized as a coordinate position, whereby it is possible to enhance the extracting accuracy of the embedded information.

To check if the detected dot is an isolated point, gaps in respective four directions are checked for existence. More specifically, as shown in FIG. 6, it is checked whether or not the detected dot is an isolated point, in each of the four directions 2101 to 2104. When the results of white, white, black, black, white, and white are obtained as detection results in a vertical direction 2101, there is a possibility that the black portion, i.e. the dot is an isolated point. However, the detection results do not deny the possibility that the above-described dot is a component of a lateral line. Similarly, also when it is determined only by a check in a lateral direction 2102 that the detected dot can be an isolated point, actually, there is a possibility that the dot is a component of a vertical line.

In the present embodiment, the dot detecting section 2002 checks whether or not the detected dot is an isolated point in each of the four directions 2101 to 2104, whereby it is possible to detect each dot as a component element of the LVBC with high accuracy. If it is determined that a dot detected in an area has a possibility of being isolated in each of all the four directions 2101 to 2104, the dot is detected as a component element of the LVBC.

Figure 7:
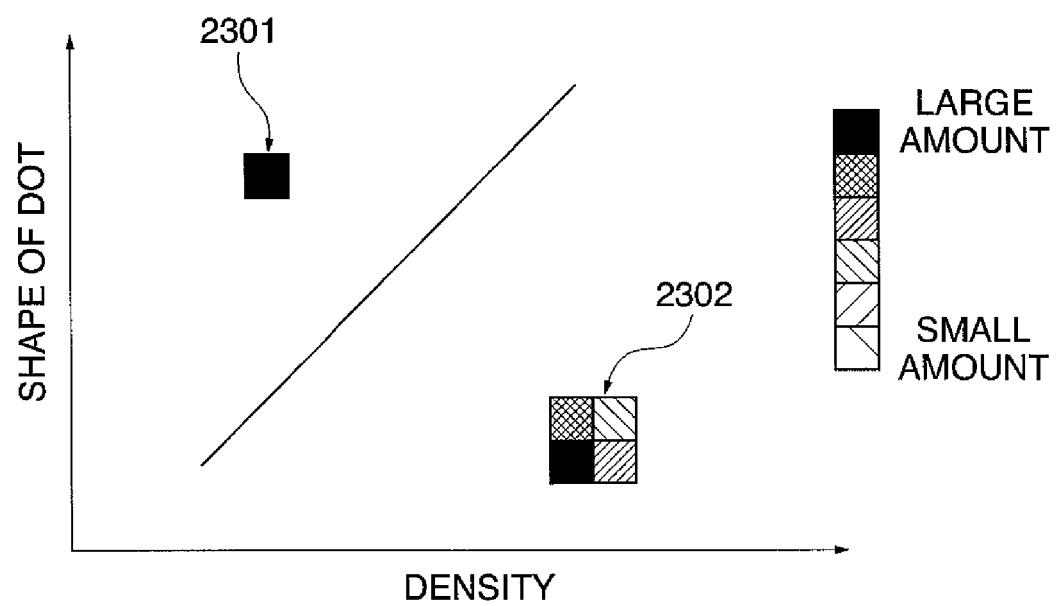
FIG. 7 is a graph showing the difference between dots constituting the LVBC and dots constituting halftone.

Next, the process carried out by the dot analysis section 2003 will be described with reference to FIG. 7. FIG. 7 is a graph showing the difference between LVBC dots as component elements of an LVBC and halftone dots. In FIG. 7, the vertical axis represents the shape of dots, and the horizontal axis represents the density of dots. The density of points represents the frequency of appearance of dots.

Dots detected by the dot detecting section 2002 sometimes include dots that do not form the LVBC. The dots that do not form the LVBC correspond e.g. to dot patterns for representing halftone images contained in an original image, and isolated points (e.g. dots added to a Japanese hirakana letter) contained in an original. To eliminate isolated points which do not serve as component elements of the LVBC, elimination of halftone dots is performed.

FIG. 7 shows that the frequency of appearance of dots is higher as the density of dots is higher (the color of dots is blacker). Now, in the case of the dots that form the LVBC, they are made uniform in shape and density, and hence the frequency of appearance thereof has a peak in a narrow area in the graph (2301 in FIG. 7). In contrast, in the case of halftone dots, they are not standardized in shape and density, and hence the dots appear sparsely at a wider area in the graph, and the frequency of appearance thereof is relatively low (2302 in FIG. 7). By using the above characteristics of dots, the dot analysis section 2003 identifies the dots whose frequency of appearance has a peak at the narrow area in the FIG. 7 graph, as LVBC dots. The position (absolute coordinate position) of each of these dots is stored in the absolute coordinate position-storing section 2004, the other dots are eliminated. This process makes it possible to almost completely extract only dots that form the LVBC, though there is also a possibility that part of unnecessary dots remains. Therefore, the respective absolute coordinate positions of dots stored in the absolute coordinate position-storing section 2004 sometimes include the positions of dots that form the LVBC and the positions of unnecessary dots that remain without being eliminated.

Figure 8:
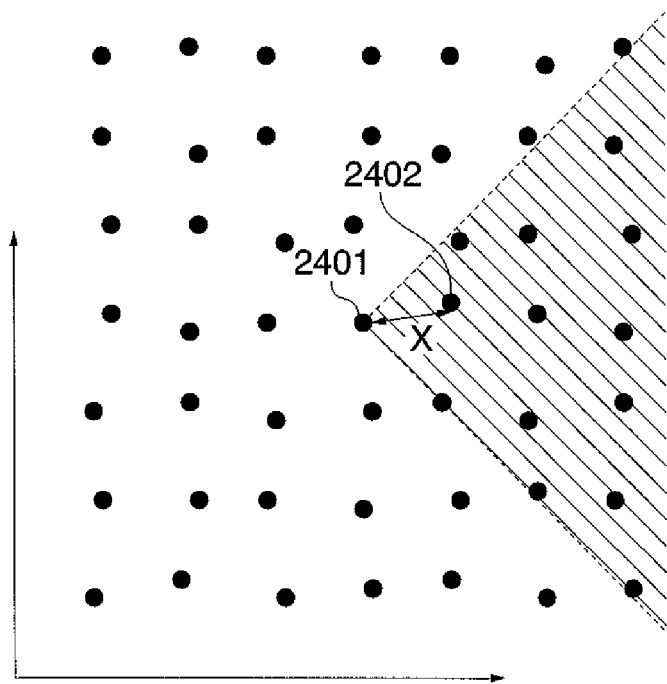
FIG. 8 is a schematic view useful in explaining a method of measuring grid spacing.
Figure 9:
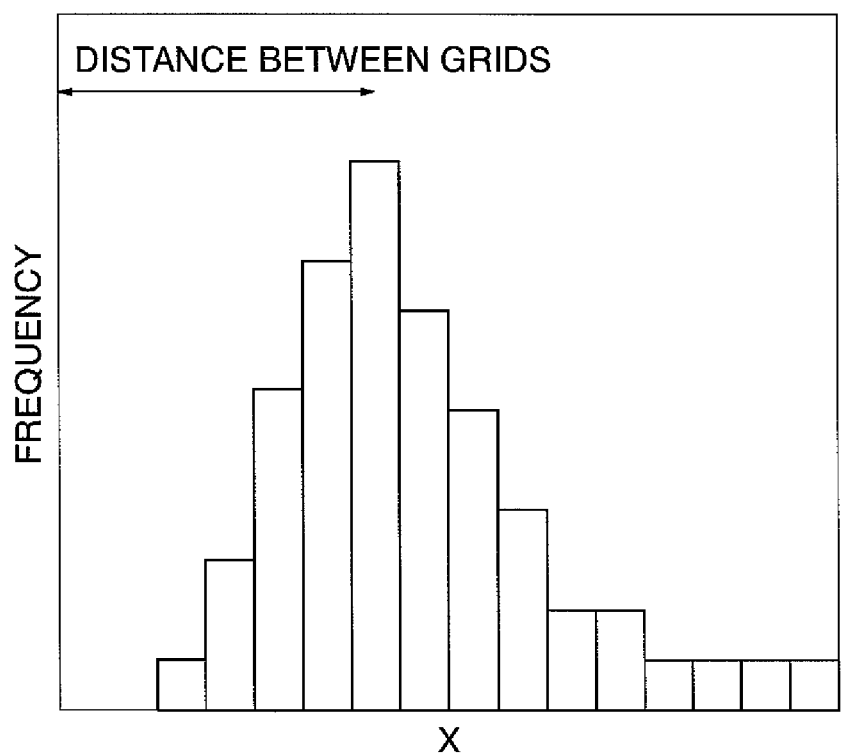
FIG. 9 is a view showing an example of a histogram that represents a frequency of the distance between grid lines.

Next, the process carried out by the dot converting section 2005 will be described with reference to FIGS. 8 to 11D. FIG. 8 is a schematic view useful in explaining a method of measuring grid spacing. FIG. 9 is a view showing an example of a histogram that represents the frequency of the distance between grid lines. FIGS. 10A to 10D are schematic views useful in explaining correction of the rotational angle of the grid. FIGS. 11A and 11B are views showing, by way of example, correction results of the rotation of the grid and grid-point positions determined from the correction results.

The rotational angle of a LVBC dot, which is formed on a sheet when printing is performed, and the rotational angle of a dot that is obtained when the sheet is read by the scanner 170, are slightly displaced e.g. due to the orientation of the sheet disposed in the scanner 170. To correct the displacement, the dot converting section 2005 detects and corrects the rotational angle of each dot. Further, in the case of the LVBC, since information is represented by a displacement of each LVBC dot from position of a grid point to which the dot belongs, it is necessary to reproduce the grid. In doing this, grid spacing has to be determined accurately.

Referring to FIG. 8, assuming that a dot 2401 is of interest, it is estimated that the distance X from the dot 2401 to the closest dot 2402 corresponds to the grid spacing. Candidates for the dot closest to the dot of interest are dots positioned at respective four locations upward, downward, leftward, and rightward of the dot of interest. Further, to reduce load on a calculation process, only dots e.g. within a range of π/2 (rad) on the right side of the dot of interest 2401 are searched to determine dots closest to the dot of interest 2401.

More specifically, when the absolute coordinate position of the dot of interest is designated by (x, y), and the absolute coordinate position of an arbitrary dot other than the dot of interest is designated by (a, b), dots satisfying the following equation (1) are regarded as dots outside the calculation range.

$$a - x \leq 0$$

or $$|a-x| \leq |b-y| \tag{1}$$

Further, each dot that minimizes the distance between the absolute coordinate positions (x, y) and (a, b) is defined as an adjacent dot, and the distance X between the dot of interest and the adjacent dot is defined as a candidate for the grid spacing. Both the dot of interest 2401 and the adjacent dot 2402 are displaced so as to embed information therein, and actually there is a possibility that the distance X therebetween takes a value different from accurate grid spacing. Further, there is also a possibility that actually, a dot recognized as a LVBC dot is a halftone dot remaining without being eliminated by the dot analysis section 2003. To solve above-described problems, by the method described above, the distance between grid lines is calculated for each of all the dots of interest (x, y), and a histogram, such as one appearing in FIG. 9, is prepared which shows the respective frequencies of different grid line-to-grid line distances (distances between grid lines) determined for all the dots of interest.

In FIG. 9, the horizontal axis represents values of the distance X as candidates for the grid line-to-grid line distance, and the vertical axis represents frequency with which a value of the distance X from the dot of interest (x, y) is determined by calculation. Further, the distance X determined with the highest frequency is set to grid spacing based on the FIG. 9 histogram.

For example, assuming that the probabilities of appearance of the displacement position of each of the dot of interest 2401 and an adjacent dot 2402 from respective associated grid points are the same with respect to the vertical and horizontal directions, the distance X corresponding to the value (most frequent value) can be determined as the grid spacing (grid line-to-grid line distance) based on the histogram of a large number of dots of interest.

When the rotational angle of the grid is to be corrected, first, an angle of direction from each of all the dots to an adjacent one thereof on the absolute coordinate is detected. Originally, an angle of direction from a dot of interest and an adjacent dot is one of 0 (rad), π/2 (rad), π (rad), and 3π/2 (rad)

as reference angles. Therefore, it is possible to determine the rotational angle of the grid based on the difference of the detected angle from each of the reference angles.

Now, when a vector from a dot of interest to an adjacent one thereof is designated by (dx, dy), an angle θ of direction from the dot of interest to the adjacent one is expressed by the following equation (2):

$$\theta = \mathrm{atan}\, 2(dy, dx) \quad (2)$$

Figure 10A:
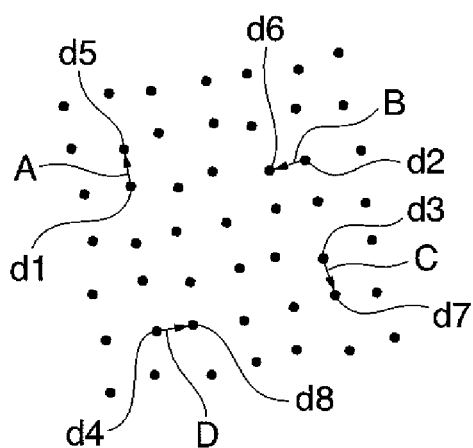
FIGS. 10A, 10B, 10C and 10D are schematic views useful in explaining correction of the rotational angle of a grid.
Figure 10B:
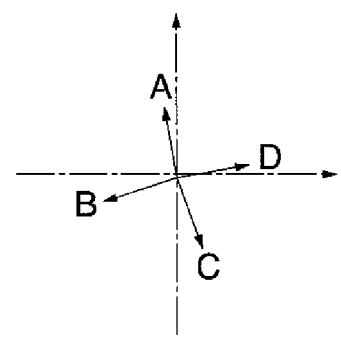

For example, referring to FIGS. 10A to 10D, now let it be assumed that vectors A, B, C, and D extend from dots d1, d2, d3 and d4 to adjacent dots thereof d5, d6, d7 and d8, respectively. Angles θ of the respective vectors A, B, C, D are calculated since dots of interest and adjacent dots thereof are actually displaced from the central position of an associated grid point. As a result, the angles θ on the absolute coordinate shown in FIG. 10B are obtained.

Figure 10C:
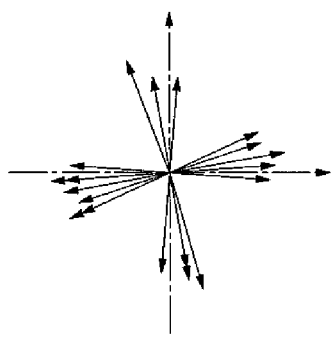
Figure 10D:
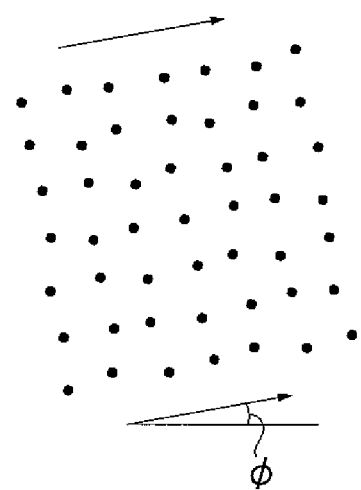
Figure 11A:
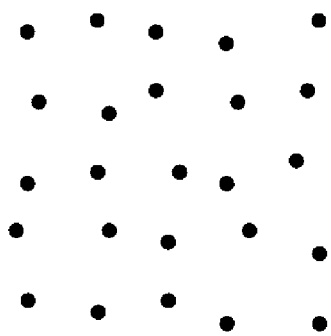
FIGS. 11A and 11B are views showing, by way of example, correction results of the rotation of the grid and grid-point positions obtained from the correction results.
Figure 11B:
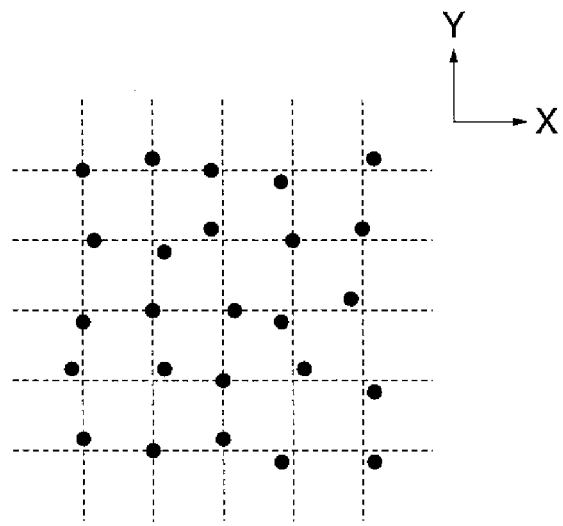

As described above, all the dots are used as dots of interest, and angles between the dots of interest and adjacent ones thereof are calculated. Now, let it be assumed that the probabilities of appearance of the displacement position of each of the dot of interest and an adjacent dot from respective associated grid points are the same with respect to the vertical and horizontal directions. Then, by adding the differences of the angle from a reference angle calculated for all the dots of interest, it is possible to calculate the average rotational angle of the grid. For example, as shown in FIG. 10C, when the rotational angles separately calculated are superimposed on the absolute coordinate, the average rotational angle can be obtained, thereby making it possible to make the average rotational angle approximate to the rotational angle of the grid. As shown in FIG. 10D, this makes it possible to obtain the rotational angle φ of the grid on the absolute coordinate.

More specifically, a reference vector is calculated for each of the angles θ associated with individual dots of interest, and a total rotational angle φ can be determined based on the sum of all the reference vectors. Now, if the sum of all the reference vectors is designated by (A, B), the rotational angle φ of the grid is approximated by the following equation (3):

$$\phi = a\tan2(B, A) \quad (3)$$

ここで

$$A = \sum_i \cos(4\theta_i)$$

$$B = \sum_i \sin(4\theta_i)$$

When the rotational angle φ of the grid is calculated as described above, the grid is reversely rotated by the rotational angle φ to thereby correct the rotation of the grid. It should be noted that although the orientation of the sheet disposed in the scanner 170 can become equal to any of four angles of 0 (correct), π/2 (rad), π (rad), and 3π/2 (rad) whenever the grid rotates through π/2 (rad), actually, it is not known to which of the four angles the orientation of the sheet corresponds. This makes it necessary to further correct the rotation of the grid by one of the above-described four angles. This correction will be described hereinafter.

After the rotation of the grid is corrected, as shown in FIG. 11A, each dot as a component of the LVBC is placed at a normal position (normal position determined according to the result of calculation) on the absolute coordinate. Then, as shown in FIG. 11B, imaginary straight lines are drawn in respective grid spacings determined by the dot converting section 2005 in the X direction and the Y direction, respectively, and intersections of the straight lines are determined as the respective central positions of grid points. Then, the position of a dot which is associated with each grid point and is displaced from the central position of the grid point is determined. The positions of dots, determined as above, represent corresponding numerical values (see FIG. 4). Thus, the positions of dots each associated with a grid point and displaced from the central position of the grid point are determined, whereby it is possible to extract embedded information.

Figure 12:
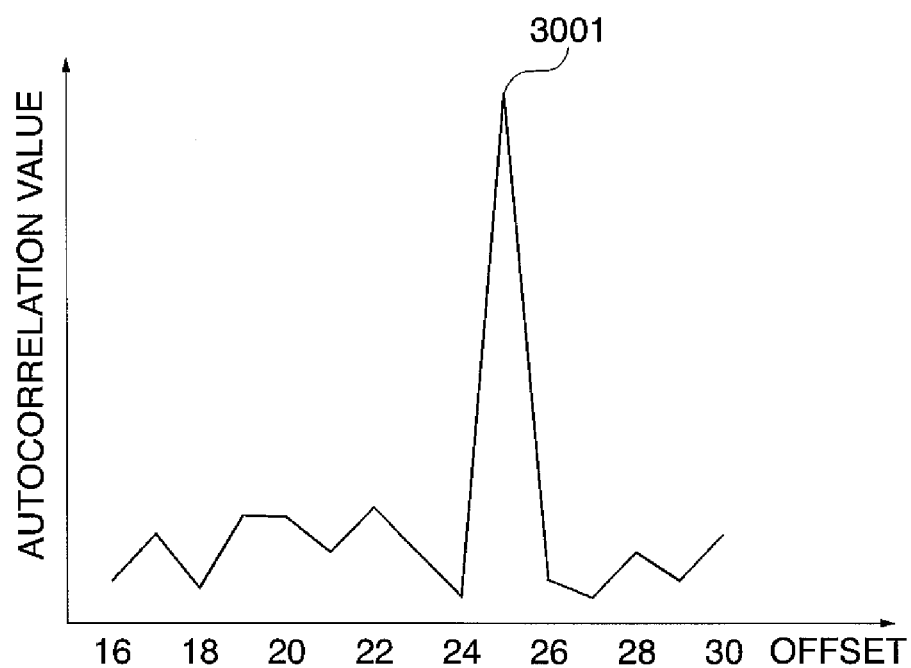
FIG. 12 is a graph showing the relationship between offset values and autocorrelation values with reference to which a repetitive cycle of the repeated arrangement of the first area is calculated.
Figure 13:
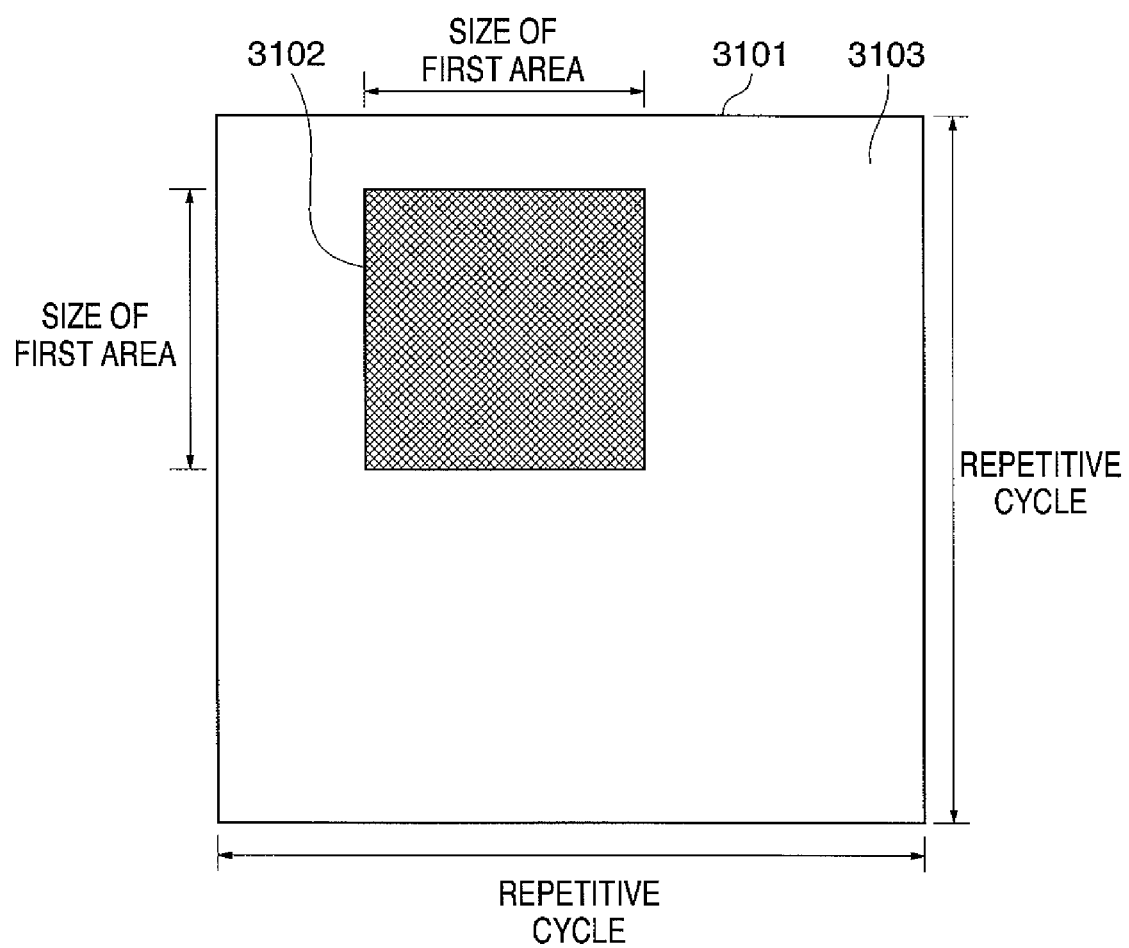
FIG. 13 is a schematic view showing the size of the first area and the repetitive cycle thereof.
Figure 14:
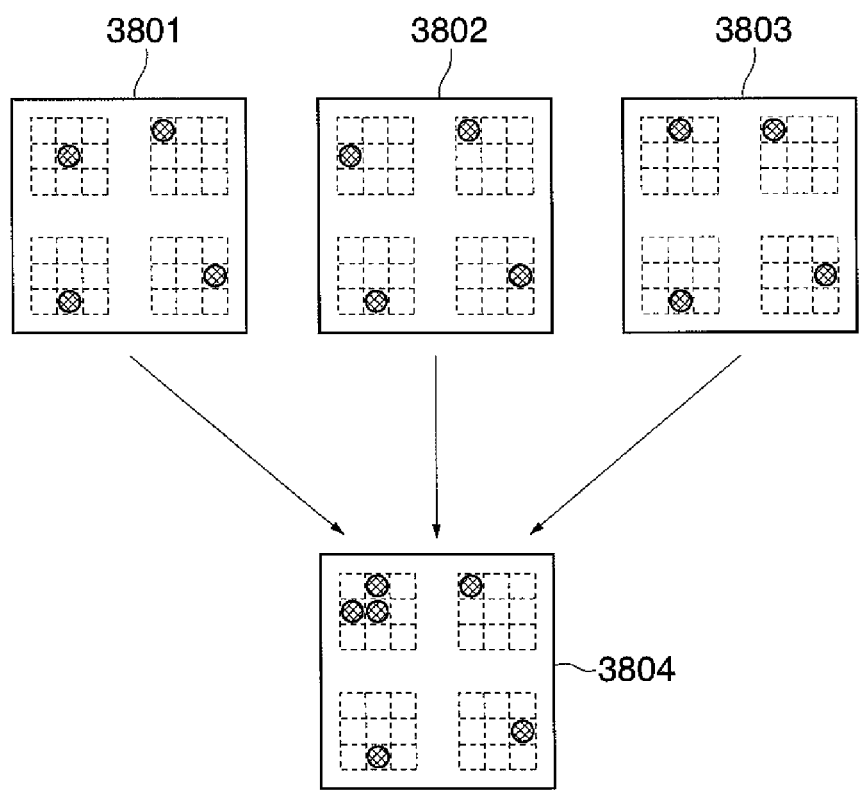
FIG. 14 is a schematic view useful in explaining a method of compiling the positions of dots written in the respective first areas.
Figure 15:
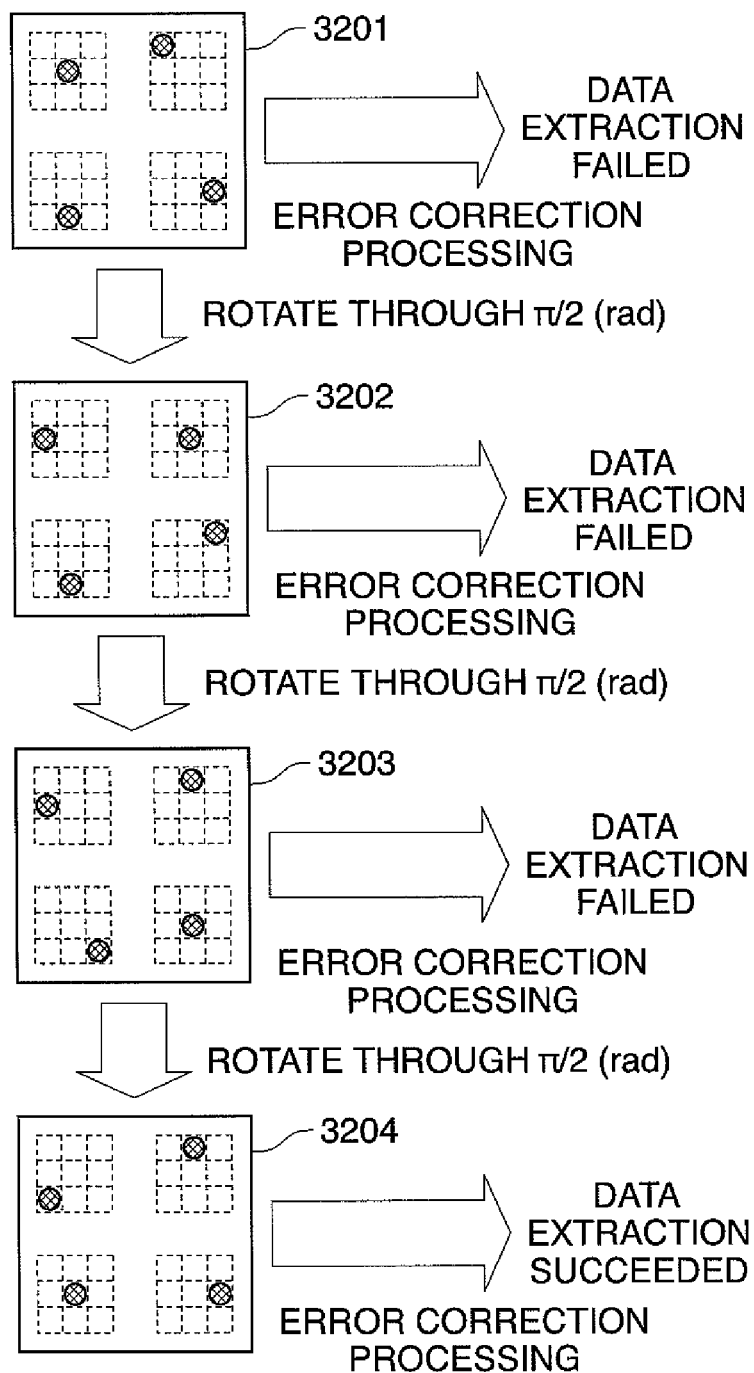
FIG. 15 is a schematic view useful in explaining a process for rotating data during correction of errors.

Next, the process carried out by the first area-decoding section 2007 will be described with reference to FIGS. 12 to 15. FIG. 12 is a graph showing the relationship between offset values and autocorrelation values with reference to which a repetitive cycle of the repeated arrangement of the first area is calculated. FIG. 13 is a schematic view showing the size of the first area and the repetitive cycle thereof. FIG. 14 is a schematic view useful in explaining a method of compiling the positions of dots written in a plurality of the first areas, respectively. FIG. 15 is a schematic view useful in explaining a process for rotating data during correction of errors.

As described above with reference to FIG. 3, the plurality of first areas are arranged on the sheet by repeatedly disposing the same area in a repetitive cycle. Here, the size of the first areas 2901, the repetitive cycle, and the positions of the first areas are not known, and hence it is necessary to calculate them.

First, the first area-decoding section 2007 calculates the repetitive cycle of the first areas. The same information is embedded in each of the first areas, and hence by performing autocorrelation of the information at an offset value in the vertical direction, the autocorrelation is high when the offset value matches the repetitive cycle. This autocorrelation of the information is used to determine the repetitive cycle. Now, the autocorrelation is for evaluating the frequency with which specific embedded information appears in a regular pattern. The autocorrelation value is for evaluating similarity of embedded information in a specific offset value. For example, as shown in FIG. 12, autocorrelation values are calculated in association with respective offset values.

An autocorrelation function COR (A, B) used for calculation of the autocorrelation values is calculated by the following equation (4)

$$COR(A, B) = \mathrm{bitcount}(\mathrm{not}(A \text{ xor } B)) \quad (4)$$

In the above equation, "xor" designates exclusive OR of two terms, and "not" designates negation. Further, "bitcount" represents a function for counting the number of bits of 1 in a bit string. For example, when A designates 010b, and B designates 011b, (not(A xor B))=not(001b)=110b holds, whereby bitcount=2 holds.

Now, let it be assumed that the first areas is defined as a matrix having a predetermined width and height, and the bit string for evaluating the first areas is defined as CELL (x, y), wherein x and y of the CELL designate vertical and horizontal coordinates.

For example, as shown in FIG. 3, if the first area is formed by a square area a side of which has a length corresponding to eight grid point-associated dots, the length of the bit string of the CELL (x, y) in the first area is equal to 3 bits×8×8=192 bits.

Now, the autocorrelation values of all the coordinates in a certain offset are calculated using a function expressed by the following equation (5):

autocorrelation value (Offset) = (5)

$$\sum_x \sum_y COR(\text{CELL}(x, y), \text{CELL}(x, y - \text{offset}))$$

Assuming that the first area is a square shape one side of which has a length corresponding to 8 grid point-associated dots and the repetitive cycle of the first areas is equal to 8×3=24 grid point-associated dots, autocorrelation of the first area gives, as shown in FIG. 12, an offset value=24, and the autocorrelation has a peak value indicated by reference numeral 3001. From the above, it is possible to set an offset value=24 to the repetitive cycle.

As described above, after the repetitive cycle of the first area is determined by the above-described autocorrelation, next, the positions of the first areas and the size thereof are determined.

To determine the positions of the first areas, as shown in FIG. 13, an area 3101 of a size corresponding to the above-described repetitive cycle is read out from the relative coordinate position-storing section 2006, since the repetitive cycle of the first area has already been determined. Then, a correlation is determined between the read-out area 3101 and an adjacent area read out next, and a correlation is determined between the same and a second adjacent area read out next. When this operation is repeatedly carried out, as to first areas 3102 contained in read-out areas 3101, the same data appear at the same repetitive cycle as that of the first area 3102, and hence the first areas 3102 in the respective read-out areas give a high correlation therebetween. As to other portions of the read-out areas 3101 than the first areas 3102, that is, second areas 3103, the same data does not appear at the same repetitive cycle as that of the first area 3102, and hence the correlation between the second areas 3103 is low. By making use of the above characteristics of the first and second areas, the start position and the end position of each of the portions having a high correlation is identified as the start position and the second position of the first area, whereby it is possible to determine the size of the first area.

When the respective positions of the first areas and the size thereof are obtained as described above, information embedded in the first area is decoded. When information embedded in only one of a plurality of the first areas is decoded, there is a fear that the positions and size of the first areas are erroneously detected due to an error in measuring the same and noise, and hence the positions of dots written in all the first areas are complied. Then, based on the results of the compilation, the most frequent values are used for decoding information.

For example, as shown in FIG. 14, when a plurality of first areas 3801 to 3803 that are located at different positions, respectively, are extracted, the positions of dots written in all the first areas 3801 to 3803 are complied. Now, let it be assumed that based on the results of the compilation, the positions of dots in an area 3804 representative of the first areas are obtained. In this case, at a left upward part of the area 3804, the positions of the dots are displaced e.g. due to noise and error. However, in the present embodiment, the most frequent values are determined based on the results of the compilation of all the first areas. Therefore, it is possible to adopt the dot position indicating the most frequent value as a correct position of the dot.

Then, information is decoded based on the respective positions of the dots. Since the influence of noise and error has not been eliminated at this time, an error correcting process is carried out on the decoding results.

As described above with reference to FIG. 4, first, displacement of each dot from the central position of an associated grid point is extracted, and the displacement is converted into corresponding data. This causes extraction of a data string embedded in the first area. Recorded in this data string are not only data, such as data for inhibiting copying, which is actually used, but also an error correction code which is provided for detecting data destruction or corruption and restoring the same if possible.

Although a large number of error correction codes are provided as known techniques, in the present embodiment, an LDPC (Low Density Parity Check) method is employed, which has a very high capability of error correction, and is known to have a characteristic close to the Shannon limit. Since the LDPC method is a known technique, the description thereof is omitted. Further, any suitable method other than the LDPC method may be employed insofar as it has characteristics of the error correction code.

By using the error correction code, it is possible to extract accurate embedded information even in the case where a certain degree of error, noise, and so forth are contained in the extracted grid.

Further, as described hereinabove in the description of the correction of the rotational angle, the process for correcting the rotational angle of the grid is carried out in units of $\pi/2$ (rad). Therefore, as data extracted in this process, there are four different data items, such as correct data (unrotated), data formed by rotating the correct data through $\pi/2$ (rad), data formed by rotating the correct data through $\pi$ (rad), and data formed by rotating the correct data through $3\pi/2$ (rad), depending on the orientation of an original set in the scanner 170. Therefore, error correction is performed by the LDPC method on the extracted data assuming that the extracted data corresponds to correct data (unrotated), data formed by rotating the correct data through $\pi/2$ (rad), data formed by rotating the correct data through $\pi$ (rad), or data formed by rotating the correct data through $3\pi/2$ (rad). Only when data has been rotated through a correct angle, the error correction code functions to enable normal extraction of data.

For example, as shown in FIG. 15, first, error correction is performed on extracted data 3201. In doing this, unless the data 3201 has been rotated through a correct angle, the error correction code recorded thereon is meaningless, which makes it impossible to perform the error correction.

Next, the extracted data 3201 is rotated through $\pi/2$ (rad), and error correction is performed on data 3202 formed by the rotation. In this case as well, unless the data 3202 has been rotated through a correct angle, it is impossible to perform error correction thereon. For this reason, the extracted data 3202 is further rotated through $\pi/2$ (rad), and error correction is performed on data 3203 formed by the rotation. In this case as well, unless the data 3203 has been rotated through a correct angle, it is impossible to perform error correction thereon. For this reason, the extracted data 3203 is further rotated through $\pi/2$ (rad), and error correction is performed on data 3204 formed by the rotation. In this case, if the data 3204 has been rotated through a correct angle, the error correction code recorded thereon functions normally to perform error correction. This makes it possible to extract correct data. Now, if error correction performed on the data 3204 has failed, it is considered that the extracted data 3204 contains lots of error and noise, which means extraction of the data itself has failed.

As described above, the first area-decoding section 2007 extracts information embedded in the first areas, that is, the copy restriction information.

Figure 16:
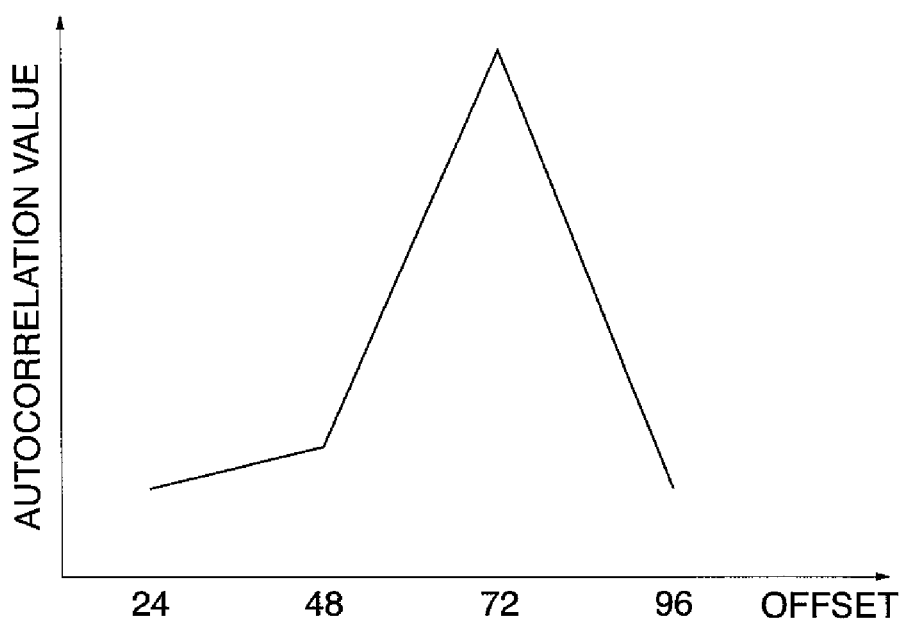
FIG. 16 is a graph showing the relationship between offset values and autocorrelation values which reference to which a repetitive cycle of the repeated arrangement of the second area is determined.
Figure 17:
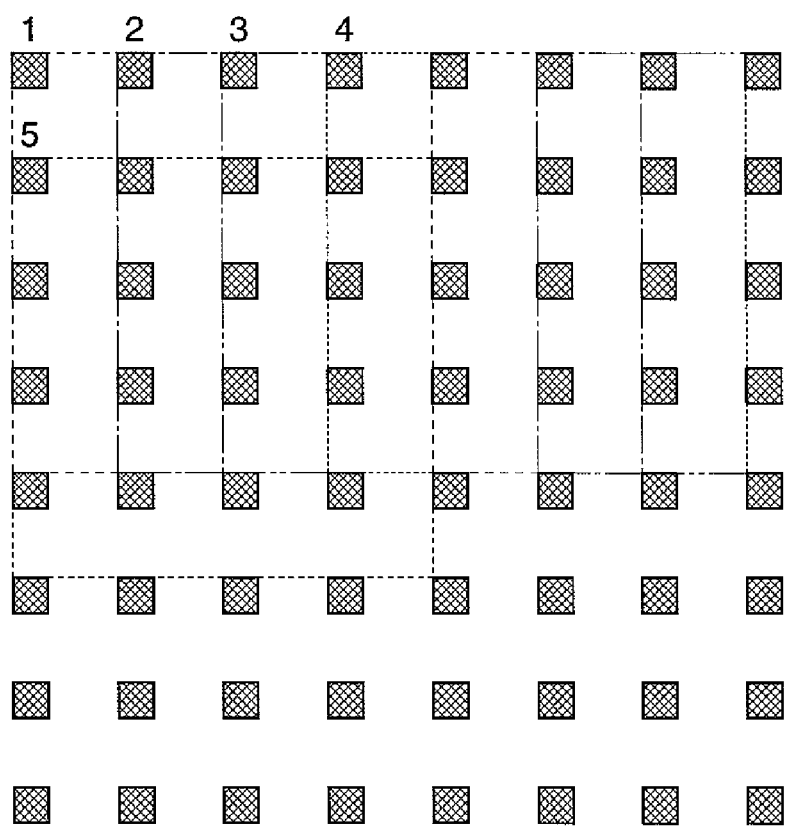
FIG. 17 is a schematic view useful in explaining a method of determining the positions of the second areas.

Next, the process carried out by the second area-decoding section 2008 will be described with reference to FIGS. 16 and 17. FIG. 16 is a graph showing the relationship between offset values and autocorrelation values which reference to which a repetitive cycle of the repeated arrangement of the second area is determined. FIG. 17 is a schematic view useful in explaining a method of determining the positions of the second areas.

The second areas are for embedding the tracking information that is not absolutely required for performing copying operation. Therefore, by omitting decoding of information embedded in the second areas, it is possible to suppress reduction of the overall processing speed.

First, the second area-decoding section 2008 determines the repetitive cycle of the second area and the size thereof. To determine the repetitive cycle of the second area, similarly to the first area, autocorrelation of the second area is calculated. The second areas are arranged at a repetitive cycle which is predetermined multiple of the repetitive cycle of the first area. Therefore, it is only required to perform autocorrelation in each of units of multiple (e.g. 24, 48, 72 . . . ) of the repetitive cycle of the first area. This makes it possible to omit calculation of the repetitive cycle of the second area. Further, the size of the second area corresponds to the repetitive cycle of the second area. The autocorrelation values with respect to the offset values in the second area are shown e.g. in a graph appearing in FIG. 16.

When the repetitive cycle of the second area and the size thereof are thus determined, the respective positions of the second areas are determined. First, the start position of the second area is identified. In embedding information, the start position of the first area and the start position of the second area are made synchronous with each other, so that it is possible to narrow down the start position of the second area to one of the start positions of the respective first areas.

To determine the respective positions of the second areas, an error correction code is used. Similarly to the first areas, not only original information, such as the tracking information, but also an error correction code is embedded in the second areas. Now, since the size of the second area has already been determined, the error correcting process is sequentially carried out from the start position of each of specific one of the first areas, assuming the start position of the second area is the same as the start position of the specific one of the first area For example, as shown in FIG. 17, if it is determined by autocorrelation that the size of the second area corresponds to four times as long as the repetitive cycle of the first area, the start position of one of the 16 (4×4) first areas is the start position of the second area. Therefore, the error correcting process is carried out while the start position of the second area is shifted while shifting the start potion of the second area such that the start position of a sequentially selected one of the first, second, third, fourth, fifth, . . . areas is sequentially set to the start position of the second area. When the error correcting process is successful, the start position of the first area selected at this time is set to the start position of the second area.

Thus, the repetitive cycle, size and positions of the second area are determined to extract information embedded in the second areas.

Figure 18:
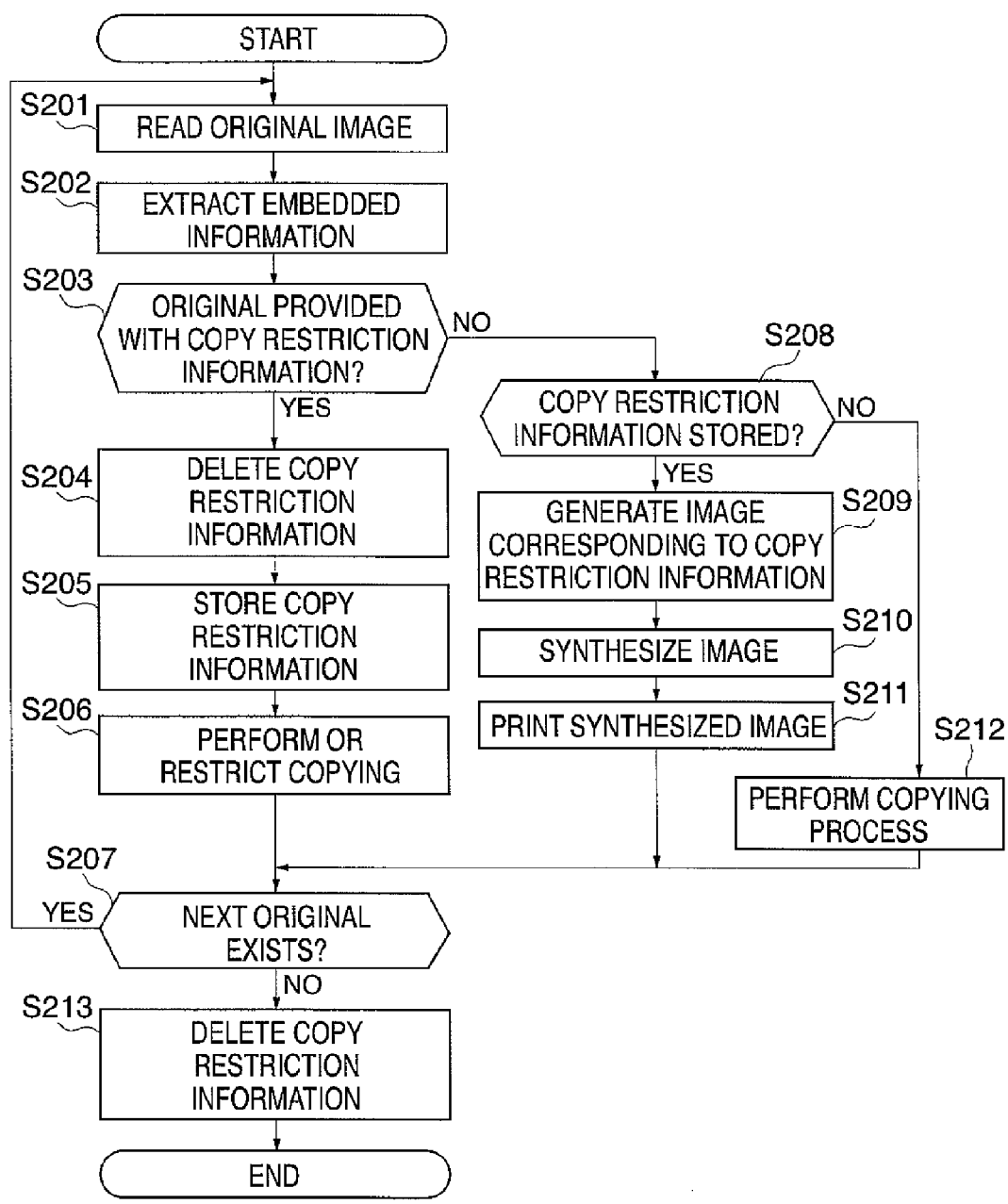
FIG. 18 is a flowchart showing a copying operation of a copying machine 100 appearing in FIG. 1.

Next, the copying operation of the copying machine 100 will be described with reference to FIG. 18. FIG. 18 is a flowchart showing the copying operation of the FIG. 1 copying machine 100. The FIG. 18 copying operation is performed under the control of the control section 150. Now, let it be assumed that when an original bundle is copied in which an original A (e.g. first image) having the copy restriction information embedded in the first areas and an original B (e.g. second image) having no copy restriction information embedded in the first areas are mixed, the original A is read first.

When the user inputs a copy start instruction via the operating section 101, as shown in FIG. 18, the control section 150 instructs the scanner 170 to start reading of an image on the original. The scanner 170 reads the image on the original (step S201). Then, the control section 150 instructs the embedded information-extracting section 110 to perform a process for extracting the copy restriction information based on image data output from the scanner 170 (step S202). The embedded information-extracting section 110, which receives the instruction, performs process for extracting the copy restriction information from the original.

Next, the control section 150 determines whether or not the original read this time is provided with the copy restriction information, depending on whether or not the copy restriction information has been extracted by the embedded information-extracting section 110 (step S203). In the step S203, when the original read this time is provided with copy restriction information, if there is any copy restriction information stored in the embedded information-storing section 111, the control section 150 deletes the copy restriction information (step S204). After that, the control section 150 causes the copy restriction information extracted from the original read this time to be stored in the embedded information-storing section 111 (step S205). The embedded information-storing section 111 stores the copy restriction information extracted by the embedded information-extracting section 110.

Then, the control section 150 copies the original read this time, or restricts copying of the original read this time, according to the extracted copy restriction information (step S206). In the step S206, as described hereinabove, if authentication information (e.g. a password) for canceling inhibition of copying is extracted together with information indicative of inhibition of copying, as the copy restriction information, authentication is performed using the extracted authentication information. If validity of the user is authenticated by the above authentication, the inhibition of copy is canceled, and the image data output from the scanner 170 is subjected to predetermined image processing by the image processing section 130, and then stored in the image storage section 140. The image data stored in the image storage section 140 is sent to the printer 190. The printer 190 prints an image on a sheet based on the above image data. Thus, a copy of the original read this time is obtained. On the other hand, if the validity of the user is not authenticated by the authentication, the control section 150 inhibits printing based on the image data output from the scanner 170. Further, also if only the information indicative of inhibition of copying is extracted as the copy restriction information, the control section 150 inhibits printing based on the image data output from the scanner 170.

Next, the control section 150 determines based on a signal from the scanner 170 whether or not there exists a next original to be read in the scanner 170 (step S207). If there exists a next original to be read, the control section 150 returns to the above-mentioned step S201. In contrast, if there is not a next original to be read, the control section 150 deletes the copy restriction information stored in embedded information-storing section 111 (step S213), followed by terminating the present process.

If it is determined in the aforementioned step S203 that the original read this time is not provided with the copy restriction information, the control section 150 determines whether or not the copy restriction information is stored in the embedded information-storing section 111 (step S208). If it is determined in the step S208 that the copy restriction information is not stored in the embedded information-storing section 111, the control section 150 copies the original read this time (step S212). The image data output from the scanner 170 is subjected to predetermined image processing by the image processing section 130, and then stored in the image storage section 140. Then, the image data stored in the image storage section 140 is sent to the printer 190. The printer 190 prints an image on a sheet based on the image data.

If it is determined in the step S208 that the copy restriction information is stored in the embedded information-storing section 111, the control section 150 instructs the embedded information-generating section 112 to generate dot data corresponding to the copy restriction information (step S209). In response to the instruction, the embedded information-generating section 112 generates dot pattern data (data in the form of LVBC) corresponding to the copy restriction information stored in the embedded information-storing section 111. Then, the control section 150 instructs the image processing section 130 to synthesize the generated dot pattern data and the image data output from the scanner 170 (step S210). In response to the instruction, the image processing section 130 synthesizes the generated dot pattern data and the image data output from the scanner 170, and the synthesized image data is sent to the printer 190 via the image storage section 140. The printer 190 prints an image on a sheet based on the synthesized image data, and delivers the sheet as a copy (step S211). Thus, a copy having the copy restriction information embedded therein is obtained as the copy of the original having no copy restriction information embedded therein.

Next, the control section 150 determines based on a signal from the scanner 170 whether or not there exists a next original to be read in the scanner 170 (step S207). If there is a next original to be read, the control section 150 returns to the above-mentioned step S201. In contrast, if there is not a next original to be read, the control section 150 deletes the copy restriction information stored in embedded information-storing section 111 (step S213), followed by terminating the present process.

As described above, according to the present embodiment, when an original that has the copy restriction information embedded therein and an original that has no copy restriction information embedded therein are arranged in a mixed state for copying, it is possible to embed the same copy restriction information in a copy of the original having no copy restriction information embedded therein. This makes it possible to uniformly restrict copying forming respective copies of the original that has the copy restriction information embedded therein and the original that has no copy restriction information embedded therein.

The copying machine has been described as an example of the image processing apparatus, and copying has been described as an example of outputting of images. Other examples of the image processing apparatus include a facsimile machine that performs facsimile transmission of image data based on read image data, and a digital composite machine that transfers image data based on read image data via a network. In this case, in the step S206, the copying machine copies or restricts copying of the original whereas the facsimile machine and the digital composite machine transfer or restrict transfer of image data according to the copy restriction information. Further, in the steps S211 and S212, the copying machine performs printing based on image data, whereas the facsimile machine and the digital composite machine transfer image data. Thus, even when an original that has the copy restriction information embedded therein and an original that has no copy restriction information embedded therein are arranged in a mixed state for transfer of images, it is possible to embed the same copy restriction information in the image of the original that has no copy restriction information embedded therein.

It is to be understood that the present invention may also be realized by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the above described embodiment may be accomplished not only by executing the program code read out by a computer, but also by causing an OS (operating system) or the like which operates on the computer to perform a part or all of the actual operations based on instructions of the program code.

Further, it is to be understood that the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-110604 filed Apr. 19, 2007, which is hereby incorporated by reference herein in its entirety.

What is claimed is:

1. An apparatus comprising:
    a reader unit configured to read a first image from a first sheet and a second image from a second sheet, the first sheet and the second sheet being different;
    a search unit configured to search for a dot pattern from the read first image and from the read second image;
    a synthesis unit configured to synthesize the read second image and an image generated based on a dot pattern found on the first read image, in a case where the search unit finds the dot pattern from the read first image but does not find a dot pattern from the second image; and
    an output unit configured to output the read first image and a result of the synthesis, on a sheet.

2. An apparatus as claimed in claim 1, wherein said output unit prints the first image and the result, or transfers the first image and the result.

3. An apparatus as claimed in claim 1, wherein the extracted information is information for controlling output of the read first image and the read second image.

4. An apparatus as claimed in claim 1, wherein said output unit outputs the image in the case where the read second image does not have information for forbidding output of the image.

5. An apparatus as claimed in claim 1, wherein the dot pattern is a barcode.

6. A method of controlling an image processing apparatus that outputs an image, comprising:
 a reading step of reading a first image from a first sheet and a second image from a second sheet, the first sheet and the second sheet being different;
 a search step of searching for a dot pattern from the read first image and from the read second image;
 a synthesis step of synthesizing the read second image and an image generated based on a dot pattern found on the first read image, in a case where the search step finds the dot pattern from the read first image but does not find a dot pattern from the second image; and
 an output step of outputting the read first image and a result of the synthesis, on a sheet.

7. An apparatus as claimed in claim 6, wherein the dot pattern is a barcode.

8. A non-transitory computer-readable storage medium which stores a program for causing a computer to execute a method of controlling an image processing apparatus which reads an image to output an image based on the read image, wherein the method comprises:
 a reading step of reading a first image from a first sheet and a second image from a second sheet, the first sheet and the second sheet being different;
 a search step of searching for a dot pattern from the read first image and from the read second image;
 a synthesis step of synthesizing the read second image and an image generated based on a dot pattern found on the first read image, in a case where the search step finds the dot pattern from the read first image but does not find a dot pattern from the second image; and
 an output step of outputting the read first image and a result of the synthesis, on a sheet.

9. An apparatus as claimed in claim 8, wherein the dot pattern is a barcode.

\* \* \* \* \*